United States Patent Office 3,673,038
Patented June 27, 1972

3,673,038
METHOD FOR BRAZING GRAPHITE AND OTHER REFRACTORY MATERIALS
Domenic A. Canonico, Oak Ridge, Nancy C. Cole, Knoxville, and Clarence W. Houck, Lake City, Tenn., assignors to the United States of America as represented by the United States Atomic Energy Commission
No Drawing. Filed Apr. 14, 1970, Ser. No. 28,539
Int. Cl. B32b 15/00
U.S. Cl. 29—195         1 Claim

ABSTRACT OF THE DISCLOSURE

The present invention is directed to a novel class of titanium-vanadium-chromium alloys which are particularly useful in brazing graphite and other refractory materials to themselves and to each other, and to the resultant brazed composites. Within the context of this invention, the refractory materials which can be joined by the hereinafter-defined brazing alloy are selected from such materials as tungsten, molybdenum, tantalum, rhenium, niboium, alloys thereof, and graphite.

BACKGROUND OF THE INVENTION

The invention described herein was made in the course of, or under, a contract with the U.S. Atomic Energy Commission.

In order to fabricate structural assemblies of fairly complicated geometry for applications at intended service temperatures up to about 1400° C. from such materials as graphite and other refractory materials mentioned above, it is desirable and sometimes necessary to provide a brazing alloy for joining the components. The criteria for such brazing alloy are: that it melts over a narrow range of temperature; that it easily wets and flows on the surfaces to be joined; that it freezes over a relatively narrow range of temperature no more than about 50° C.; and that it is mechanically compatible with the materials to be joined in the sense that no brittle intermetallic phases are formed, no adverse diffusion of alloying components will occur, or that other mechanisms will operate to reduce the strength and useful life of the resultant brazed component. Furthermore, the remelting temperature of the as-brazed alloy should be above the highest intended service temperature of the structure.

SUMMARY OF THE INVENTION

It is accordingly the principal object of this invention to provide a brazing alloy which meets these requirements in forming brazed composite assemblies of the aforementioned refractory materials. This and other objects of this invention are satisfied by providing an alloy consisting essentially of, by weight, 50 to 85 percent titanium, 10 to 45 percent vanadium, and 5 to 20 percent chromium.

The brazing alloys within the scope of this invention exhibit virtually complete solid solution solubility over the entire claimed range, with little to no evidence of a secondary phase. The individual elements of the alloy apparently co-act to produce the favorable qualities needed to form satisfactory brazed joints. It can be stated in general terms that the titanium and the vanadium contribute, in large measure, to the ability of the alloy to wet and flow on the refractory metals at the brazing temperature. iWthin the above specified ranges, minimum melting temperatures are achieved. When the vanadium content of the alloy exceeds about 45 percent, by weight, the melting temperature becomes significantly elevated beyond the desired maximum melting point. When the titanium and vanadium are in generally the proportion 70 Ti–30 V, as present in a Ti–V binary eutectic, there is essentially no difference in the solidus and liquidus temperatures. Within the specified ranges, any difference between the solidus and liquidus temperatures is not detrimental.

Chromium is necessary in the alloy of this invention to provide adequate flowability of the alloy on graphite. About 5 percent, by weight, appears to be a minimum value to accomplish this flowability. As the chromium content increases, it tends to make the brazing alloy less ductile; and, above about 20 percent, by weight, the alloy is too brittle to permit rolling into thin sheets or forming into wire for alloy preplacement applications.

The brazing alloys within the scope of this invention melt at a temperature within the range of about 1350° C. to 1550° C. To achieve maximum flowability and adherence on graphite, the braze should be effected at temperatures which do not exceed more than about 50° C. the alloy melting point. Higher temperatures will decrease the flowability even though satisfactory wettability is obtained. This temperature limitation does not apply to refractory metal brazing. Within the context of this invention, satisfactory wettability is demonstrated when the alloy forms good fillets at the joints between he refractory materials. An alloy with good flowability is one which flows from one end along the entire length of a three-inch-long inverted T specimen, and flows along feying surfaces and into interstices of low density graphites to provide a mechanical as well as a metallurgical bond.

It is of interest to note that alumina, $Al_2O_3$, can be joined by utilizing the ternary brazing alloy described herein. However, the titanium-vanadium-chromium system has a different flowability characteristic on alumina than on graphite. If the ratio of titanium to vanadium is kept constant, the brazing behavior of the alloy on alumina and graphite appears to be chromium dependent; for example, alloys with less than 25 percent chromium flow on graphite but not on alumina, whereas alloys with greater than 25 percent chormium flow on alumina. As previously mentioned, however, alloys of high, i.e., above 20 percent, chromium content are more brittle and cannot be rolled into thin sheets or formed into wire for preplacement.

Having described the invention in general terms, the following example is illustrative of the practice of forming brazed composites with the brazing alloys of this invention.

EXAMPLE

Three alloys were prepared as 20-gram buttons by vacuum casting. The compositions of the alloys were 61 percent titanium, 24 percent vanadium, 15 percent chromium; 68 percent titanium, 27 percent vanadium, 5 percent chromium; and 57 percent titanium, 23 percent vanadium, and 20 percent chromium. Each of the alloy buttons was rolled into sheets 0.005 inch thick. Strips of each alloy composition where then placed alongside inverted graphite T specimens. The specimens were placed in a brazing furnace and heated to 1600° C. for a period of two minutes in a vacuum atmosphere of $10^{-5}$ torr. At that temperature it was observed that the alloys readily wet and flowed along the length of the T specimens, forming a good fillet and a strong bond. The strength of the bond was indicated in subsequent brazements wherein the composite was tested in shear and failure occurred in the graphite. In all cases, failure occurred through the base graphite material and not in the brazed joint.

In another run, a 20-gram button having a composition consisting of 47.5 percent titanium, 19 percent vanadium, and 33.5 percent chromium was found to be brittle. Crushed powders of this alloy, when preplaced on an inverted T graphite specimen and when melted, wet but did not flow on the graphite components of the T joint. On the other hand, the alloy displayed excellent wettability and flowability in T joint specimens in which the arms of the T joint were made from alumina, or one was alumina and the other selected from a refractory metal.

What is claimed is:

1. A composite structure comprising at least two spaced-apart component parts and a connecting piece metallurgically bonded to and between said parts, at least one of said component parts consisting of graphite and the other consisting of graphite or a metal selected from the group consisting of tungsten, rhenium, molybdenum, tantalum, niobium, and alloys thereof, said connecting piece being a ternary alloy consisting of, by weight, prior to forming part of said composite structure, 50 to 85 percent titanium, 10 to 45 percent vanadium, and 5 to 20 percent chromium.

References Cited

UNITED STATES PATENTS

| | | | |
|---|---|---|---|
| 3,131,059 | 4/1964 | Kaarlela | 75—175.5 X |
| 3,293,741 | 12/1966 | Gilliland | 75—175.5 X |
| 3,425,116 | 2/1969 | Crooks et al. | 75—175.5 X |
| 3,515,545 | 6/1970 | Canonico et al. | 75—175.5 X |

FOREIGN PATENTS

| | | | |
|---|---|---|---|
| 1,175,683 | 12/1969 | Great Britain | 75—175.5 |
| 1,522,172 | 4/1968 | France | 75—175.5 |

CHARLES N. LOVELL, Primary Examiner

29—194, 198; 161—188, 213